United States Patent
Akimoto et al.

(10) Patent No.: US 8,256,094 B2
(45) Date of Patent: Sep. 4, 2012

(54) METHOD FOR SHAPING ELECTRIC WIRE FOR STATOR COIL OF ELECTRIC ROTATING MACHINE

(75) Inventors: Akito Akimoto, Kariya (JP); Aki Itakura, Nishio (JP); Katsuhiko Kanoh, Nagoya (JP); Kazuhiro Nobata, Chiryu (JP)

(73) Assignee: Denso Corporation, Kariya (JP)

( * ) Notice: Subject to any disclaimer, the term of this patent is extended or adjusted under 35 U.S.C. 154(b) by 120 days.

(21) Appl. No.: 12/750,194

(22) Filed: Mar. 30, 2010

(65) Prior Publication Data

US 2010/0242277 A1 Sep. 30, 2010

(30) Foreign Application Priority Data

Mar. 31, 2009 (JP) ................................. 2009-086324
Feb. 22, 2010 (JP) ................................. 2010-035559

(51) Int. Cl.
*H02K 15/00* (2006.01)
(52) U.S. Cl. ........................................... 29/596; 29/732
(58) Field of Classification Search ............ 29/596–598, 29/732–736; 310/179, 215
See application file for complete search history.

(56) References Cited

U.S. PATENT DOCUMENTS

| | | | |
|---|---|---|---|
| 5,090,110 A * | 2/1992 | Murakoshi et al. | 29/596 |
| 6,834,422 B2 * | 12/2004 | Kato | 29/596 |
| 7,472,468 B2 * | 1/2009 | Yeadon | 29/596 |
| 7,891,082 B2 * | 2/2011 | Akimoto | 29/606 |
| 2010/0242277 A1 * | 9/2010 | Akimoto et al. | 29/861 |

FOREIGN PATENT DOCUMENTS

JP 2003-264964 9/2003

* cited by examiner

*Primary Examiner* — Minh Trinh
(74) *Attorney, Agent, or Firm* — Nixon & Vanderhye PC

(57) ABSTRACT

A method is provided for shaping an electric wire for a stator coil of an electric rotating machine. The electric wire to be shaped includes a plurality of straight portions and a plurality of turn portions. Each of the turn portions includes a specific part and all of the specific parts of the turn portions are identical to each other. The method includes clamping the specific part of one of the turn portions of the electric wire in a width-wise direction thereof, holding two different sections of the specific part in a thickness-wise direction thereof, and moving one of the first and second holders relative to the other in the thickness-wise direction of the specific part, thereby shaping the specific part to form a crank-shaped portion therein.

3 Claims, 12 Drawing Sheets

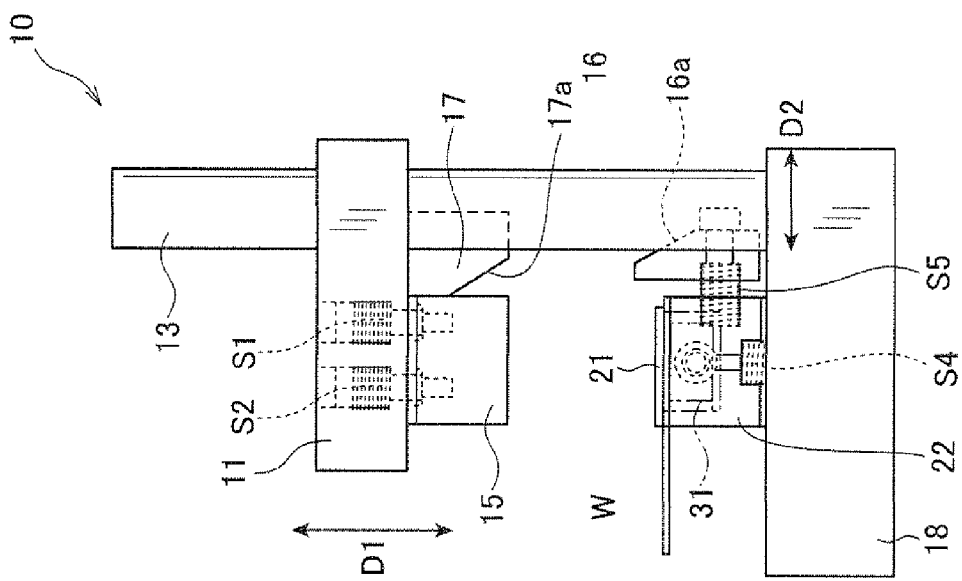
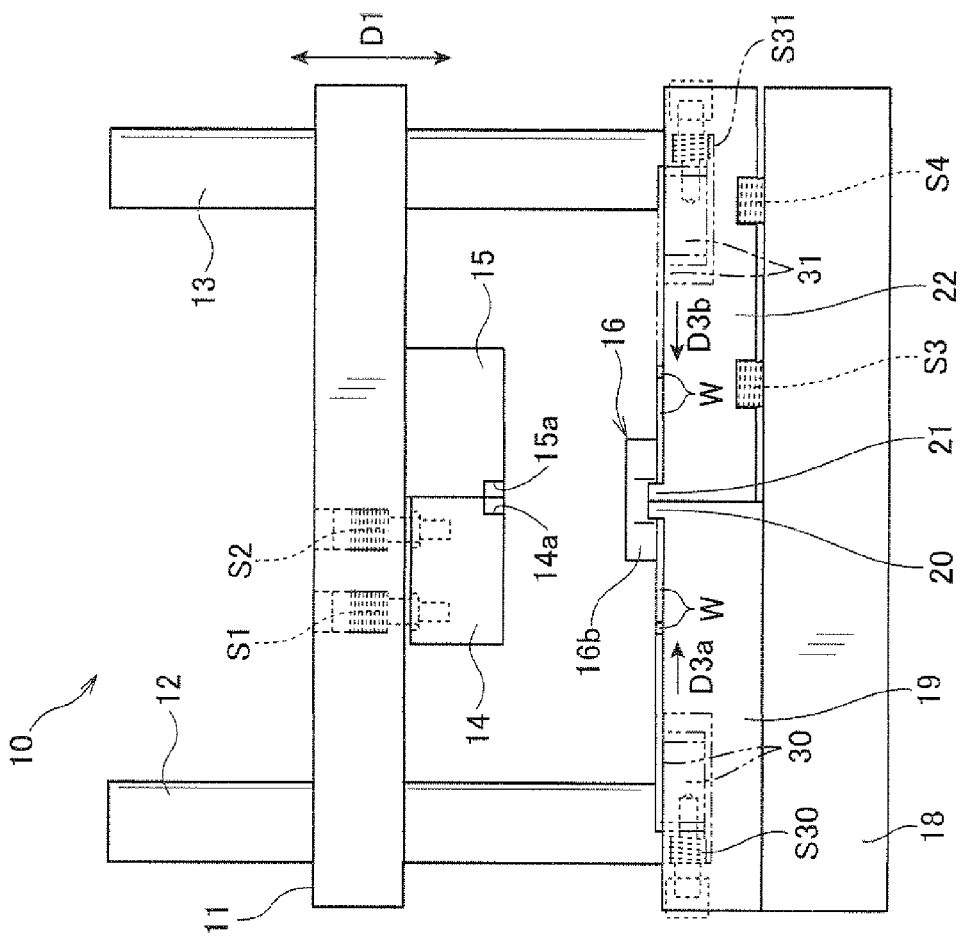

METHOD FOR SHAPING ELECTRIC WIRE FOR STATOR COIL OF ELECTRIC ROTATING MACHINE

CROSS-REFERENCE TO RELATED APPLICATIONS

This application is based on and claims priority from Japanese Patent Applications No. 2009-86324, filed on Mar. 31, 2009, and No. 2010-35559, filed on Feb. 22, 2010, the contents of which are hereby incorporated by reference into this application.

BACKGROUND OF THE INVENTION

1. Technical Field of the Invention

The present invention relates generally to methods and apparatuses for manufacturing electric rotating machines that are used in, for example, motor vehicles as electric motors and electric generators.

More particularly, the invention relates to an apparatus and a method for shaping an electric wire for a stator coil of an electric rotating machine to form coil ends of the stator coil into a desired shape. Hereinafter, the coil ends denote the axial end portions of the stator coil which are located outside of slots of a stator core of the electric rotating machine.

2. Description of the Related Art

Generally, to increase the torque density of an electric rotating machine, it is necessary to improve the space factors of electric wires, which form a stator coil of the machine, by, for example, employing rectangular-cross-section wires as the electric wires. In addition, it is also necessary to minimize the coil ends of the stator coil which have almost no contribution to the generation of torque by the electric rotating machine. Further, the coil ends of the stator coil can be minimized by, for example, providing crank-shaped portions in the coil ends.

Japanese Unexamined Patent Application Publication No. 2003-264964 discloses a method of forming crank-shaped portions in the coil ends of a stator coil of an electric rotating machine. According to the method, an electric wire with a rectangular cross section is first shaped, using a first pair of male and female shaping dies, on a first plane to form a two-dimensional crank-shaped portion in the electric wire. Then, the electric wire is further shaped, using a second pair of male and female shaping dies, on a second plane which is perpendicular to the first plane to form a three-dimensional turn portion of the electric wire. The turn portion is to be located outside of slots of a stator core of the electric rotating machine and thus constitutes a part of the coil ends of the stator coil. The turn portion has a substantially triangular shape and includes the crank-shaped portion at the apex thereof. Next, with the turn portion being held between the second pair of shaping dies, the electric wire is bent at each end of the turn portion using a female bending die, thereby forming a pair of straight portions of the electric wire. The straight portions are connected by the turn portion and to be respectively received in two slots of the stator core. In addition, the interval between the straight portions of the electric wire defines a coil pitch of the stator coil.

With the above method, however, the stator coil is allowed to have only one coil pitch that is determined by the shape and size of the female bending die.

On the other hand, a stator coil of an electric rotating machine may be formed by first stacking a plurality of electric wires to form a flat band-shaped electric wire assembly and then rolling the electric wire assembly by a predetermined number of turns into a hollow cylindrical shape. In such a stator coil, the radius of each of the electric wires gradually increases from the inmost turn to the outmost turn of the stator coil. Accordingly, the stator coil is required to have a plurality of coil pitches that increase from the inmost turn to the outmost turn of the stator coil.

Therefore, when the method disclosed in Japanese Unexamined Patent Application Publication No. 2003-264964 is applied to shape the electric wires for forming the stator coil which has the plurality of coil pitches, it is necessary to employ a plurality of female bending dies having different shapes and sizes. As a result, the manufacturing cost of the stator coil will be increased. In addition, during the shaping process of each of the electric wires, it is necessary to replace the female bending dies the plurality of times, thereby increasing the time required for manufacturing the stator coil.

SUMMARY OF THE INVENTION

According to one aspect of the present invention, there is provided an electric wire shaping apparatus for shaping an electric wire for a stator coil of an electric rotating machine. The electric wire has a substantially rectangular cross-section and includes a plurality of straight portions and a plurality of turn portions. The straight portions extend straight in parallel with each other and are spaced at predetermined intervals. Each of the straight-portions is to be received in one of a plurality of slots of a stator core of the electric rotating machine. Each of the turn portions connects one adjacent pair of the straight portions and is to be located outside of the slots of the stator core. Each of the turn portions includes a specific part and all of the specific parts of the turn portions are identical to each other regardless of the intervals between the straight portions. The electric wire shaping apparatus includes a clamping mechanism, first and second holders, and a shaping mechanism. The clamping mechanism clamps the specific part of one of the turn portions of the electric wire in a width-wise direction of the specific part. The first and second holders respectively hold two different sections of the specific part in a thickness-wise direction of the specific part. The shaping mechanism moves one of the first and second holders relative to the other in the thickness-wise direction of the specific part, thereby shaping the specific part to form a crank-shaped portion in the specific part.

With the above configuration, the electric wire shaping apparatus can shape the electric wire to form the crank-shaped portion in each of all the specific parts of the turn portions. Further, all the specific parts of the turn portions of the electric wire are identical to each other regardless of the intervals between the straight portions of the electric wire (i.e., regardless of the coil pitches defined by the electric wire). Therefore, it is possible to form the crank-shaped portion in each of all the specific parts with the same components, in other words, without replacing any components of the electric wire shaping apparatus. Consequently, it is possible to reduce both the manufacturing cost and manufacturing time of the stator coil which has a plurality of coil pitches. In addition, with the clamping mechanism clamping the specific part in the width-wise direction, it is possible to suppress the insulating coat covering the specific part from bulging in the width-wise direction during the formation of the crank-shaped portion in the specific part.

In further implementations of the present invention, each of the turn portions of the electric wire may be preferably stepped to include an apex part at the center thereof. For each of the turn portions, the specific part may be preferably the apex part of the turn portion. In this case, it is possible, without complicating the shape of the electric wire, to secure the identical specific parts in the turn portions of the electric wire while allowing the intervals between the straight portions of the electric wire to be different.

The clamping mechanism may preferably have a plurality of contact surfaces for making contact with the specific part. Each of the contact surfaces may be preferably shaped so as to fit to one of side surfaces of the specific part. In this case, the contact surface area between the clamping mechanism and the specific part of the turn portion of the electric wire can be maximized. As a result, the clamping mechanism can firmly clamp the specific part in the width-wise direction thereof, thereby ensuring the accuracy of formation of the crank-shaped portion in the specific part.

The shaping mechanism may preferably include at least one elastic member that urges one of the first and second holders in the thickness-wise direction of the specific part. In this case, the one of the first and second holders which is urged by the elastic member can hold the specific part in the thickness-wise direction with a constant pressing force, thereby ensuring the accuracy of formation of the crank-shaped portion in the specific part.

The clamping mechanism may preferably include first, second, and third clamping members. The first and second clamping members may press the specific part from one side of the specific part in the width-wise direction while the third clamping member presses the specific part from the other side. The first and second clamping members may be preferably integrally formed respectively with the first and second holders. Consequently, with the integral formation, the parts count and thus the manufacturing cost of the electric wire shaping apparatus can be reduced.

The electric wire shaping apparatus may preferably further include a third holder that holds, during the shaping of the specific part, both the straight portions of the electric wire adjacent to the specific part so as to keep the interval between the straight portions unchanged during the shaping. Consequently, with the third holder, it is possible to firmly hold, during the shaping of the specific part, both the straight portions so as to keep the interval between the straight portions unchanged during the shaping. Consequently, it is possible to accurately define the coil pitches of the stator coil, thereby allowing all the straight portions of the electric wire to be smoothly placed into the corresponding slots of the stator core.

According to another aspect of the present invention, there is provided a method of shaping an electric wire for a stator coil of an electric rotating machine. The electric wire has a substantially rectangular cross-section and includes a plurality of straight portions and a plurality of turn portions. The straight portions extend straight in parallel with each other and are spaced at predetermined intervals. Each of the straight-portions is to be received in one of a plurality of slots of a stator core of the electric rotating machine. Each of the turn portions connects one adjacent pair of the straight portions and is to be located outside of the slots of the stator core. Each of the turn portions includes a specific part and all of the specific parts of the turn portions are identical to each other regardless of the intervals between the straight portions. The method includes a clamping step, a holding step, and a shaping step. In the clamping step, the specific part of one of the turn portions of the electric wire is clamped in a widthwise-direction of the specific part. In the holding step, two different sections of the specific part are respectively held by first and second holders in a thickness-wise direction of the specific part. In the shaping step, one of the first and second holders is moved relative to the other in the thickness-wise direction of the specific part, thereby shaping the specific part to form a crank-shaped portion in the specific part.

With the above method, it is possible to shape the electric wire to form the crank-shaped portion in each of all the specific parts of the turn portions. Further, all the specific parts of the turn portions of the electric wire are identical to each other regardless of the intervals between the straight portions of the electric wire (i.e., regardless of the coil pitches defined by the electric wire). Therefore, it is possible to form the crank-shaped portion in each of all the specific parts with the same components, in other words, without replacing any components of the electric wire shaping apparatus according to the invention used to shape the electric wire W. Consequently, with the above method, it is possible to reduce both the manufacturing cost and manufacturing time of the stator coil which has a plurality of coil pitches. In addition, by the clamping step, it is possible to suppress the insulating coat covering the specific part from bulging in the width-wise direction during the formation of the crank-shaped portion in the specific part.

In further implementations of the present invention, the method may preferably further include a releasing step in which the second holder first releases the specific part and then the first holder releases the specific part. In this case, it is possible to hold the specific part for a while by the first holder after the second holder releases the specific part. Consequently, it is possible to reliably keep the just-formed crank-shape portion in the specific part.

Further, the first holder may preferably include first and second holding members that are respectively located on opposite sides of the specific part in the thickness-direction of the specific part. The first holding member may be preferably pressed by an elastic force on the specific part. In the releasing step, the specific part may be preferably released from being held by the first holder by first removing the elastic force from the first holding member and then moving the first holding member away from the specific part. In this case, the specific part can be gradually released from being held by the first holder, thereby more reliably keeping the shape of the just-formed crank-shaped portion.

BRIEF DESCRIPTION OF THE DRAWINGS

The present invention will be understood more fully from the detailed description given hereinafter and from the accompanying drawings of one preferred embodiment of the invention, which, however, should not be taken to limit the invention to the specific embodiment but are for the purpose of explanation and understanding only.

In the accompanying drawings:

FIG. 2A is a front view of the electric wire shaping apparatus;

FIG. 2B is a side view of the electric wire shaping apparatus;

DESCRIPTION OF PREFERRED EMBODIMENT

One preferred embodiment of the present invention will be described hereinafter with reference to FIGS. 1-13.

Figure 1:
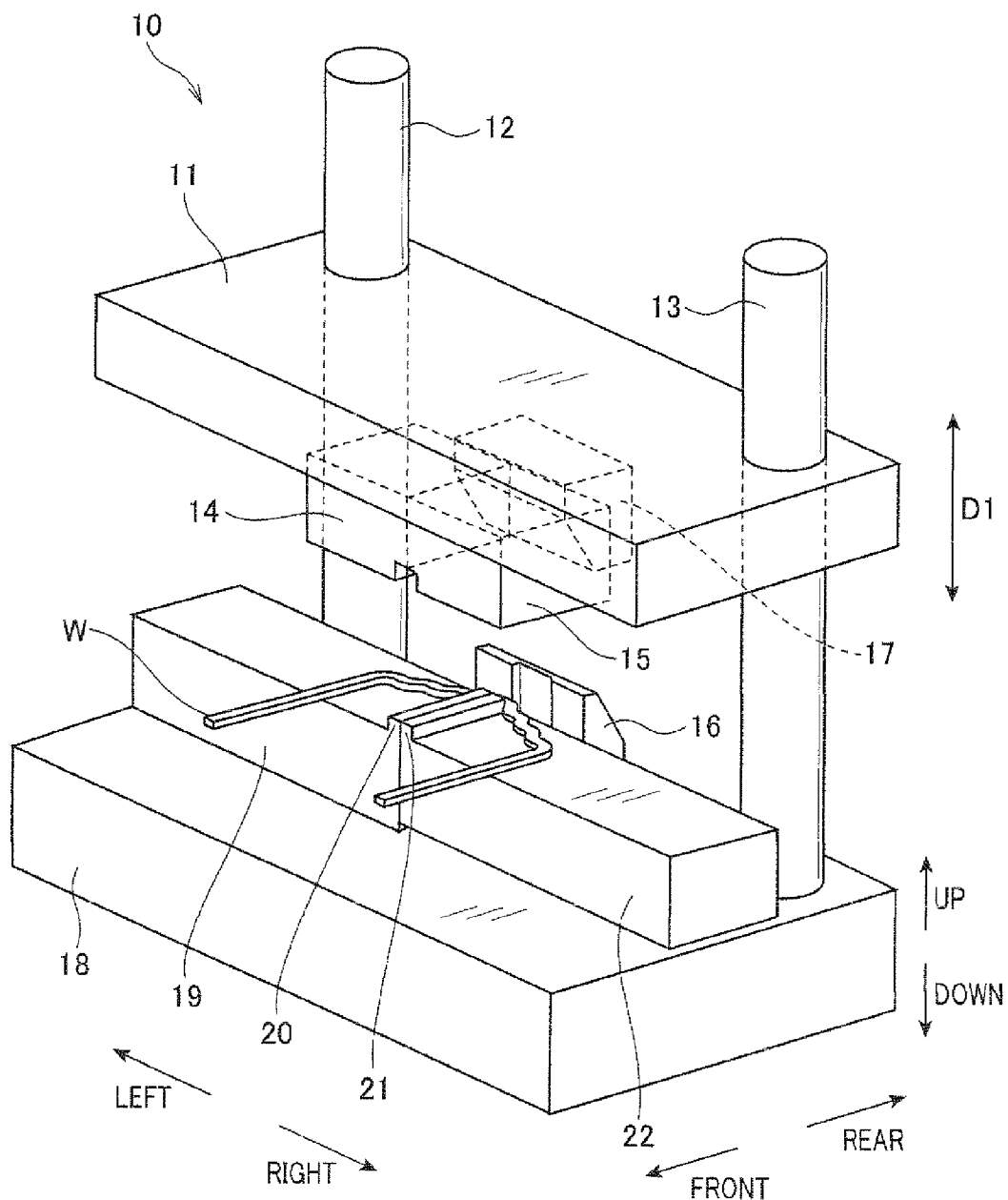
FIG. 1 is a perspective view of an electric wire shaping apparatus according the preferred embodiment of the invention.

FIGS. 1 and 2A-2B illustrate the overall configuration of an electric wire shaping apparatus 10 according the preferred embodiment of the invention. The electric wire shaping apparatus 10 is designed to shape electric wires for forming a stator coil 23 of an electric rotating machine. In addition, for the sake of simplicity, a driving mechanism (e.g., an electric motor or actuator) for driving a moving plate 11 to reciprocate in the vertical direction D1 is omitted from those figures.

As shown in FIGS. 1 and 2A-2B, the electric wire shaping apparatus 10 includes the moving plate 11, a first pair of holding members 14 and 19, a second pair of holding members 15 and 22, a clamping member 16, and a base 18.

The moving plate 11 has the shape of a hexahedron and is restricted by support rods 12 and 13 from moving in any direction other than the vertical direction D1. As described above, the moving plate 11 is driven by the not-shown driving mechanism to reciprocate in the vertical direction D. The moving plate 11 has the holding member 14 mounted to the lower face thereof; it also has both the holding member 15 and a protruding member 17 fixed to the lower face thereof. In addition, each of the support rods 12 and 13 stands on and is fixed to the upper face of the base 18.

The first pair of holding members 14 and 19 is configured to hold a left part of one section of an electric wire W in a thickness-wise direction of the section (i.e., in the vertical direction D1 in FIGS. 1 and 2A-2B) during the shaping of the section of the electric wire W to form a crank-shaped portion in the section.

The holding member 14 is, as shown in FIG. 2A, mounted to the lower face of the moving plate 11 via elastic members, more particularly via helical springs S1 and S2 in the present embodiment. Specifically, each of the springs S1 and S2 has one end fixed to the holding member 14 and the other end fixed to the moving plate 11. Further, as shown in FIG. 3B, the holding member 14 is substantially hexahedral in shape and has a recess 14a formed at the front, right, and lower corner thereof. The holding member 14 also has a protrusion 14b that is formed on the rear face of the holding member 14 along the rear and right side of the holding member 14.

The holding member 19 is, as shown in FIG. 1, directly fixed to the upper face of the base 18. The holding member 19 is also substantially hexahedral in shape and has a protrusion 20 that is formed on the upper face of the holding member 19 along the upper and right side of the holding member 19.

The second pair of holding members 15 and 22 is arranged to adjoin the first pair of holding members 14 and 19 from the right side of the first pair. The second pair of holding members 15 and 22 is configured to hold a right part of the section of the electric wire W in the thickness-wise direction of the section (i.e., in the vertical direction D1 in FIGS. 1 and 2A-2B) during the shaping of the section to form the crank-shaped portion in the section.

The holding member 15 is directly fixed to the lower face of the moving plate 11. Further, as shown in FIG. 3B, the holding member 15 is substantially hexahedral in shape and has a recess 15a formed at the front, left, and lower corner thereof. The holding member 15 also has a protrusion 15b that is formed on the rear face of the holding member 15 along the rear and left side of the holding member 15.

The holding member 22 is, as shown in FIG. 2A, mounted to the upper face of the base 18 via elastic members, more particularly via helical springs S3 and S4 in the present embodiment. Specifically, each of the springs S3 and S4 has one end fixed to the holding member 22 and the other end fixed to the base 18. Further, as shown in FIG. 1, the holding member 22 is also substantially hexahedral in shape and has a protrusion 21 that is formed on the upper face of the holding member 22 along the upper and left side of the holding member 22.

In addition, in the present embodiment, the first pair of holding members 14 and 19 constitutes a first holder of the electric wire shaping apparatus 10. The second pair of holding members 15 and 22 constitutes a second holder of the electric wire shaping apparatus 10. Further, the first and second holders, the moving plate 11, the springs S1-S4, and the driving mechanism together constitute a shaping mechanism of the electric wire shaping apparatus 10.

The clamping member 16 constitutes, together with the protrusions 20 and 21 of the holding members 19 and 22, a clamping mechanism of the electric wire shaping apparatus 10. More specifically, the clamping member 16 presses the section of the electric wire W in a width-wise direction of the section (i.e., in the horizontal direction D2 in FIG. 2B) from the rear side of the section. Meanwhile, the protrusions 20 and 21 press the section of the electric wire W in the width-wise direction from the front side of the section. The clamping member 16 moves toward the protrusions 20 and 21, thereby firmly holding the section of the electric wire W in the width-wise direction. In addition, in the present embodiment, the relative movement between the clamping member 16 and the protrusions 20 and 21 is realized by fixing the protrusions 20 and 21 while moving the clamping member 16 in the horizontal direction D2.

The clamping member 16 is mounted to the holding member 19 via a spring S5. More specifically, the spring S5 has one end fixed to the clamping member 16 and the other hand fixed to the holding member 19.

The clamping member 16 has an inclined surface 16a and a concave contact surface 16b.

The inclined surface 16a is, as shown in FIG. 2B, inclined to the vertical direction D1 so as to fit to an inclined surface 17a of the protruding member 17 that is fixed to the lower face of the moving plate 11. When the moving plate 11 is driven by the driving mechanism to reciprocate in the vertical direction D1, the inclined surface 17a of the protruding member 17 makes sliding contact with the inclined surface 16a of the clamping member 16, thereby causing the clamping member 16 to reciprocate in the horizontal direction D2. In other words, with the sliding contact between the inclined surfaces 17a and 16a, the transmitting direction of the power applied by the driving mechanism is changed from the vertical direction D1 to the horizontal direction D2.

Figure 5A:
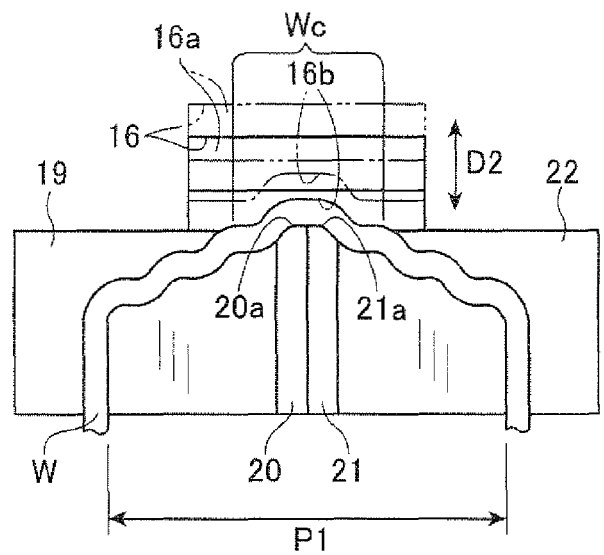
FIG. 5A is a plan view illustrating the state of a specific part of the section of the electric wire being clamped by the clamping mechanism in the width-wise direction of the specific part, wherein the section of the electric wire defines a first coil pitch P1.
Figure 5B:
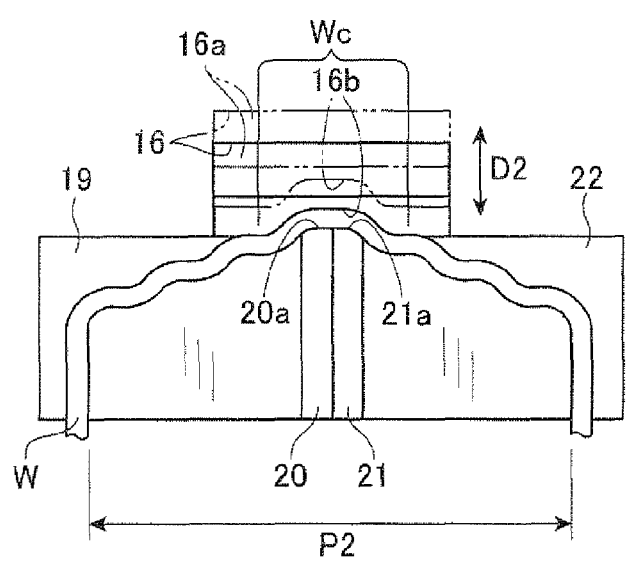
FIG. 5B is a plan view illustrating the state of the specific part being clamped by the clamping mechanism in the width-wise direction of the specific part, wherein the section of the electric wire defines a second coil pitch P2.

The concave contact surface 16b is curved, as shown in FIGS. 5A-5B, so as to fit to a convex side surface of a specific part Wc of the section of the electric wire W facing the contact surface 16b. The specific part Wc will described in detail later.

Figure 3A:
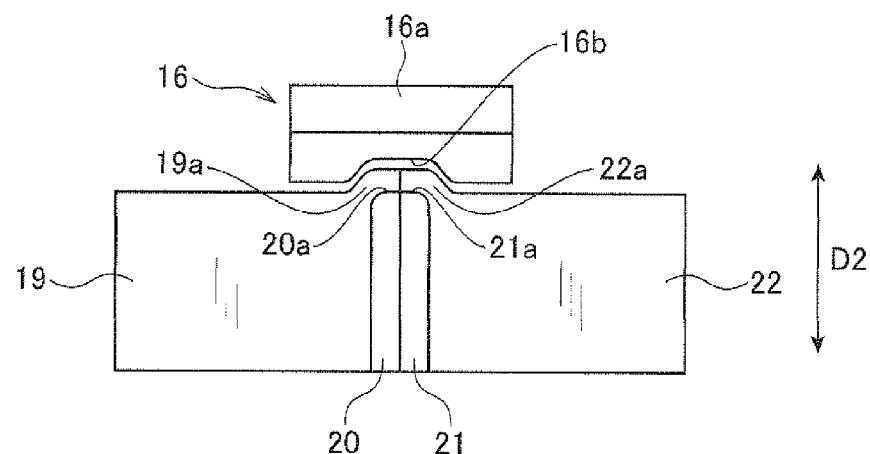
FIG. 3A is a plan view illustrating the structural relationship between a clamping mechanism and first and second pairs of holding members of the electric wire shaping apparatus.
Figure 3B:
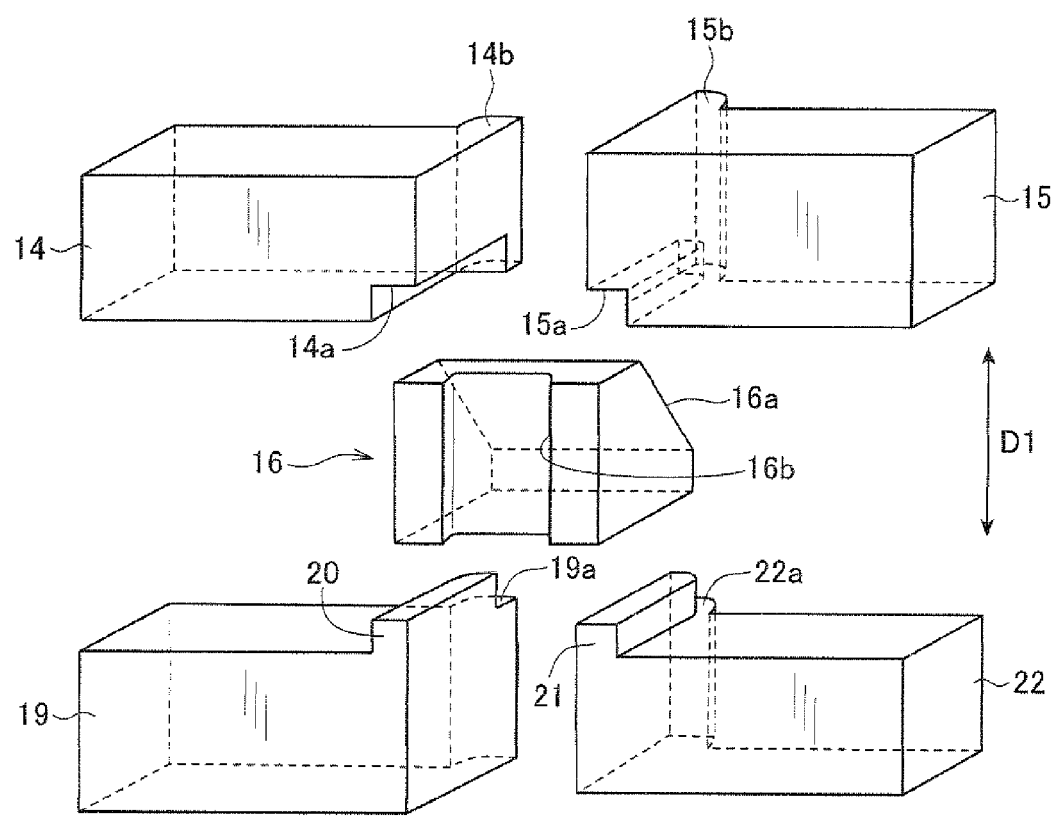
FIG. 3B is a perspective view illustrating the structural relationship between the clamping mechanism and the first and second pairs of holding members.

FIGS. 3A-3B illustrate the structural relationship between the first pair of holding members 14 and 19, the second pair of holding members 15 and 22, and the clamping mechanism that is made up of the clamping member 16 and the protrusions 20 and 21. It should be noted that for the sake of simplicity, some elements of the electric wire shaping apparatus 10 are omitted from those figures.

As shown in FIG. 3A, the holding members 19 and 22 are aligned in a horizontal direction perpendicular to the horizontal direction D2 so that the holding member 19 abuts the holding member 22 with the protrusion 20 abutting the protrusion 21.

Moreover, as shown in FIGS. 3A-3B, the holding member 19 has, in addition to the protrusion 20, a protrusion 19a that is formed on the rear face of the holding member 19 along the rear and right side of the holding member 19. The holding member 22 has, in addition to the protrusion 21, a protrusion 22a that is formed on the rear face of the holding member 22 along the rear and left side of the holding member 22. The protrusion 19a of the holding member 19 abuts the protrusion 22a of the holding member 22 in the horizontal direction perpendicular to the horizontal direction D2.

The protrusions 19a and 22a protrude backward (i.e., toward the clamping member 16) respectively from the rear faces of the holding members 19 and 22. The protrusions 19a and 22a are so shaped that the rear side surfaces of the protrusions 19a and 22a together can fit to the concave contact surface 16b of the clamping member 16. In addition, the contours of the rear side surfaces of the protrusions 19a and 22a together coincide with the contour of the convex side surface of the specific part Wc.

On the other hand, the protrusions 20 and 21 protrude upward (i.e., toward the holding members 14 and 15) respectively from the upper faces of the holding members 19 and 22. The protrusion 20 has a convex contact surface 20a that faces the left half of the contact surface 16b of the clamping member 16 in the horizontal direction D2. The protrusion 21 has a convex contact surface 21a that faces the right half of the contact surface 16b of the clamping member 16 in the horizontal direction D2. The convex contact surfaces 20a and 21a are shaped so as to together fit to a concave side surface of the specific part Wc of the section of the electric wire W facing the contact surfaces 20a and 21a.

Further, as shown in FIG. 3B, the protrusion 14b of the holding member 14 and the protrusion 19a of the holding member 19 have substantially the same cross-sectional shape and are aligned in the vertical direction D1 so as to hold therebetween the left half of the specific part Wc of the section of the electric wire W. On the other hand, the protrusion 15b of the holding member 15 and the protrusion 22a of the holding member 22 have substantially the same cross-sectional shape and are aligned in the vertical direction D1 so as to hold therebetween the right half of the specific part Wc of the section of the electric wire W. Consequently, the pair of the protrusions 14b and 19a and the pair of the protrusions 15b and 22a together can clamp the entire specific part Wc in the thickness-wise direction thereof (i.e., in the vertical direction D1).

After having described the configuration of the electric wire shaping apparatus 10 according to the present embodiment, the process of the apparatus 10 for shaping the electric wire W will be described hereinafter.

Figure 4A:
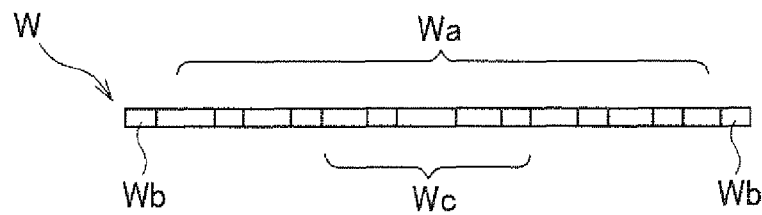
FIG. 4A is a side view of one section of an electric wire before being shaped by the electric wire shaping apparatus.
Figure 4B:
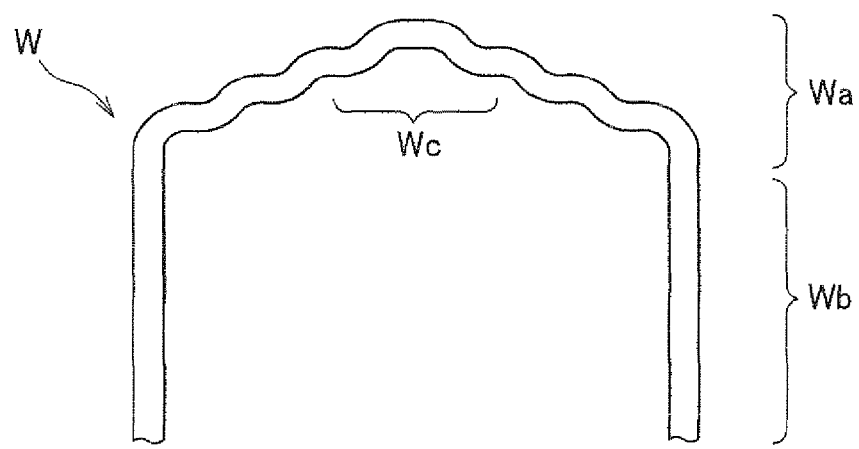
FIG. 4B is a plan view of the section of the electric wire.
Figure 4C:
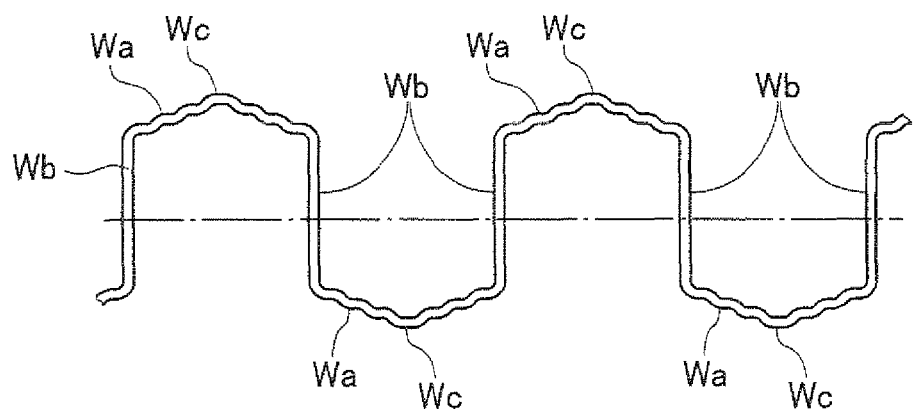
FIG. 4C is a plan view showing part of an electric wire before being shaped by the electric wire shaping apparatus.

FIGS. 4A-4B illustrate one section of the electric wire W before being shaped by the electric wire shaping apparatus 10. FIG. 4C illustrates part of the electric wire W before being shaped by the electric wire shaping apparatus 10, which includes a plurality of sections of the electric wire W.

In the present embodiment, the electric wire W is an insulation-coated electric wire with a predetermined length (e.g., several meters). More specifically, the electric wire W is made up of an electric conductor, which has a rectangular cross section and the predetermined length, and an insulating coat that covers the outer surface of the electric conductor. The electric conductor is made of, for example, copper. The insulating coat is made of a resin or enamel, for example PPS (polyphenylene sulfide).

As shown in FIGS. 4A-4C, the electric wire W includes a plurality of straight portions Wb and a plurality of turn portions Wa. The straight portions Wb extend straight in parallel with each other and are spaced at predetermined intervals. Each of the straight portions Wb is to be received in one of a plurality of slots 24a of a stator core 24 of the electric rotating machine. Each of the turn portions Wa connects one adjacent pair of the straight portions Wb and is to be located outside of the slots 24a of the stator core 24 to make up a part of the coil ends of the stator coil 23.

In addition, the section of the electric wire W shown in FIGS. 4A-4B includes only one adjacent pair of the straight portions Wb and one of the turn portions Wa which connects the pair of the straight portions Wb. As to the other sections of the electric wire W, they have the same configuration and are shaped in the same way as the section shown in FIGS. 4A-4B. Therefore, for the sake of avoiding redundancy, only the process of shaping the single section of the electric wire W will be described hereinbelow.

As shown in FIGS. 4A-4B, the turn portion Wa has been stepped, by an earlier process, to include an apex part Wc at the center thereof. With the stepped shape, it is possible to reduce the height of the coil ends of the stator coil 23. Moreover, in the present embodiment, the apex part Wc of the turn portion Wa represents the specific part of the section of the electric wire W mentioned previously.

The interval between the pair of the straight portions Wb defines a coil pitch of the stator coil 23. If the coil pitch is deviated from a desired value, the pair of the straight portions Wb cannot be respectively placed into two desired slots 24a of the stator core 24. Therefore, it is essential to set and keep the coil pitch at the desired value.

In the shaping process, the section of the electric wire W is first set on the holding members 19 and 22 of the electric wire shaping apparatus 10, as shown in FIGS. 1 and 2A-2B.

Then, the driving mechanism drives the moving plate 11 to move downward from its initial position shown FIGS. 1 and 2A-2B to reach a shaping start position, causing the clamp mechanism and the first and second holders to clamp the section of the electric wire W. As described previously, the clamp mechanism is made up of the clamping member 16 and the protrusions 20 and 21; the first holder is made up of the holding members 14 and 19; and the second holder is made up of the holding members 15 and 22.

FIGS. 5A-5B illustrate the apex part Wc of the turn portion Wa in the state of being clamped by the clamp mechanism in the width-wise direction of the apex part Wc. More specifically, FIG. 5A illustrates the case of the section of the electric wire W defining a first coil pitch P1, while FIG. 5B illustrates the case of the same defining a second coil pitch P2 that is greater than P1. In addition, in FIGS. 5A-5B, a rest position of the clamping member 16 is indicated with chain double-dashed lines, while a clamping position of the same is indicated with continuous lines. At the rest position, the clamping member 16 is away from the apex part Wc of the turn portion Wa of the electric wire W and thus exerts no clamping force to the apex part Wc. At the clamping position, the clamping member 16 makes contact with the apex part Wc to clamp, together with the protrusions 20 and 21, the apex part Wc in the width-wise direction thereof.

That is to say, the process of the electric wire shaping apparatus 10 for shaping the electric wire W includes a clamping step in which the clamping mechanism clamps the apex part Wc of the turn portion Wa of the electric wire W in the width-wise direction.

Moreover, as shown in FIGS. 5A-5B, the clamping member 16 moves in the horizontal direction D2 between the rest and clamping positions. The apex part Wc, which represents the specific part of the turn portion Wa of the electric wire W, can be kept unchanged when the coil pitch defined by the section of the electric wire W is changed, for example, from the first coil pitch P1 to the second coil pitch P2.

In the present embodiment, all the apex parts Wc of the turn portions Wa of the electric wire W are made identical to each other regardless of the coil pitches defined by electric wire W (i.e., regardless of the intervals between the straight portions Wb of the electric wire W).

Figure 5C:
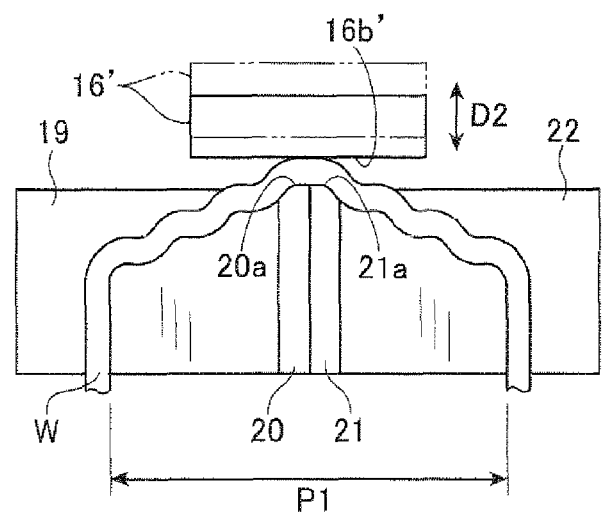
FIG. 5C is a plan view illustrating a modification of a clamping member of the clamping mechanism.

In addition, the electric wire shaping apparatus 10 may employ, instead of the clamping member 16 shown in FIGS. 5A-5B, a clamping member 16' as shown in FIG. 5C. The clamping member 16' has, instead of the concave contact surface 16b of the clamping member 16, a flat contact surface 16b' to make contact with the apex part Wc of the turn portion Wa of the electric wire W. With the clamping member 16', it is also possible to reliably clamp the apex part Wc in the width-wise direction thereof.

Figure 6A:
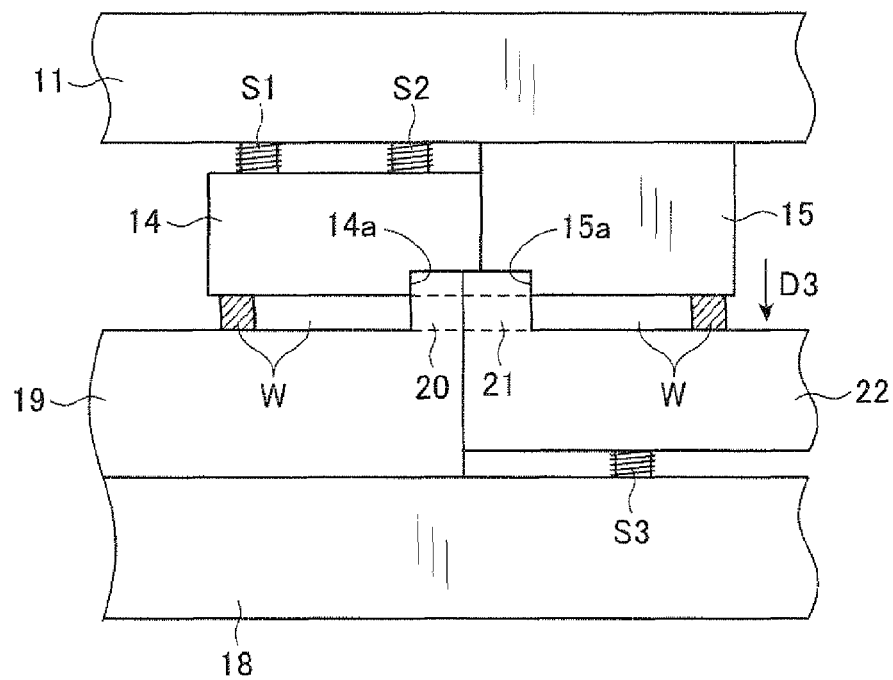
FIG. 6A is a front view illustrating the state of the section of the electric wire being clamped by the first and second pairs of the holding members in the thickness-wise direction of the specific part of the section.
Figure 6B:
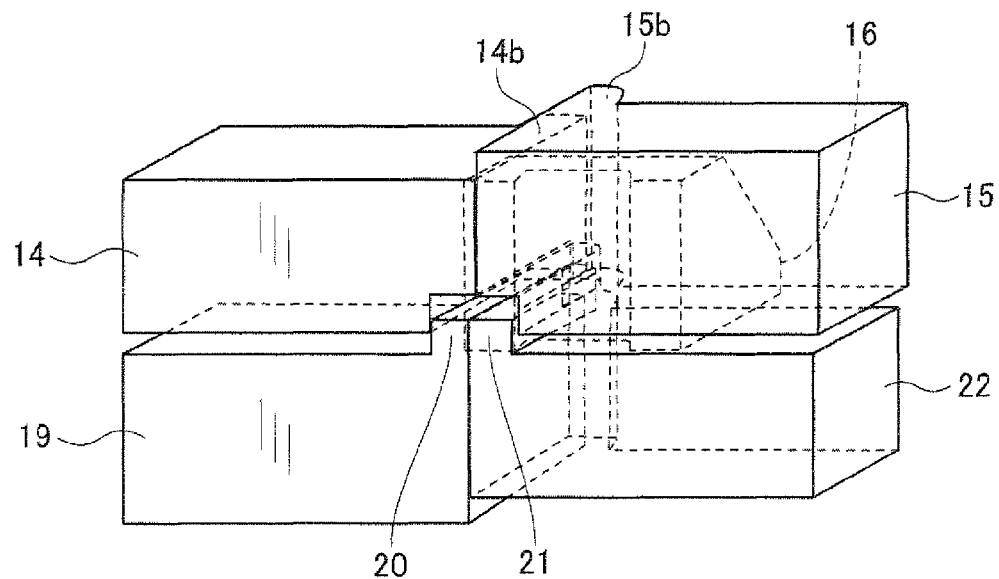
FIG. 6B is a perspective view illustrating the state of the section of the electric wire being clamped by the first and second pairs of the holding members in the thickness-wise direction of the specific part of the section.

FIGS. 6A-6B illustrate the section of the electric wire W in the state of being clamped by the first and second holders in the thickness-wise direction of the apex part Wc. It should be noted that for the sake of simplicity, some elements of the electric wire shaping apparatus 10 which are shown in FIG. 6A are omitted from FIG. 6B.

As shown in FIGS. 6A-6B, the first pair of holding members 14 and 19, which constitutes the first holder of the electric wire shaping apparatus 10, clamp therebetween the left half of the section of the electric wire W with the protrusion 20 of the holding member 19 fitted into the recess 14a of the holding member 14. At the same time, the second pair of holding members 15 and 22, which constitutes the second holder of the electric wire shaping apparatus 10, clamp therebetween the right half of the section of the electric wire W with the protrusion 21 of the holding member 22 fitted into the recess 15a of the holding member 15.

That is to say, the process of the electric wire shaping apparatus 10 for shaping the electric wire W includes a holding step in which the first and second holders respectively hold (or clamp) the left and right halves of the apex part Wc of the turn portion Wa of the electric wire W in the thickness-wise direction.

In addition, after the fitting of the protrusions 20 and 21 respectively into the recesses 14a and 15a, the holding members 14 and 22 are restricted from moving in any horizontal direction.

Next, the driving mechanism drives the moving plate 11 to move further downward (i.e., in the direction D3 shown in FIG. 6A) from its shaping start position shown in FIGS. 6A-6B to reach a shaping finish position. Consequently, the springs S1 and S2 are compressed by the moving plate 11 without causing the first pair of holding members 14 and 19 to be displaced in the vertical direction, whereas the springs S3 and S4 are compressed by the moving plate 11 to cause the second pair of holding members 15 and 22 to be displaced downward. As a result, there is created a relative movement in the vertical direction between the first and second holders which respectively clamp the left and right halves of the section of the electric wire W, thereby forming a crank-shaped portion Wd in the apex part Wc of the turn portion Wa of the electric wire W.

That is to say, the process of the electric wire shaping apparatus 10 for shaping the electric wire W includes a shaping step in which one of the first and second holders is moved relative to the other in the thickness-wise direction of the apex part Wc, thereby shaping the apex part Wc to form the crank-shaped portion Wd therein.

In addition, it should be noted that the term "crank-shaped" is used here only for the purpose of describing the overall shape of the portion Wd and does not restrict the angles of bend in the portion Wd to 90°.

Figure 7A:
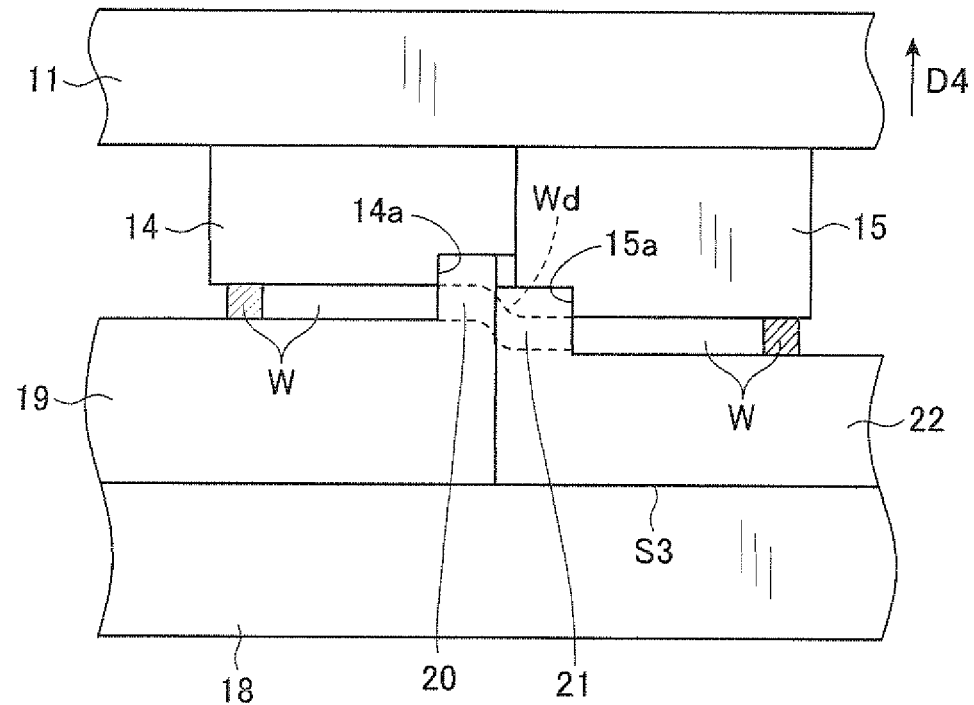
FIG. 7A is a front view showing the first and second pairs of the holding members when the formation of a crank-shaped portion in the section of the electric wire has just finished.
Figure 7B:
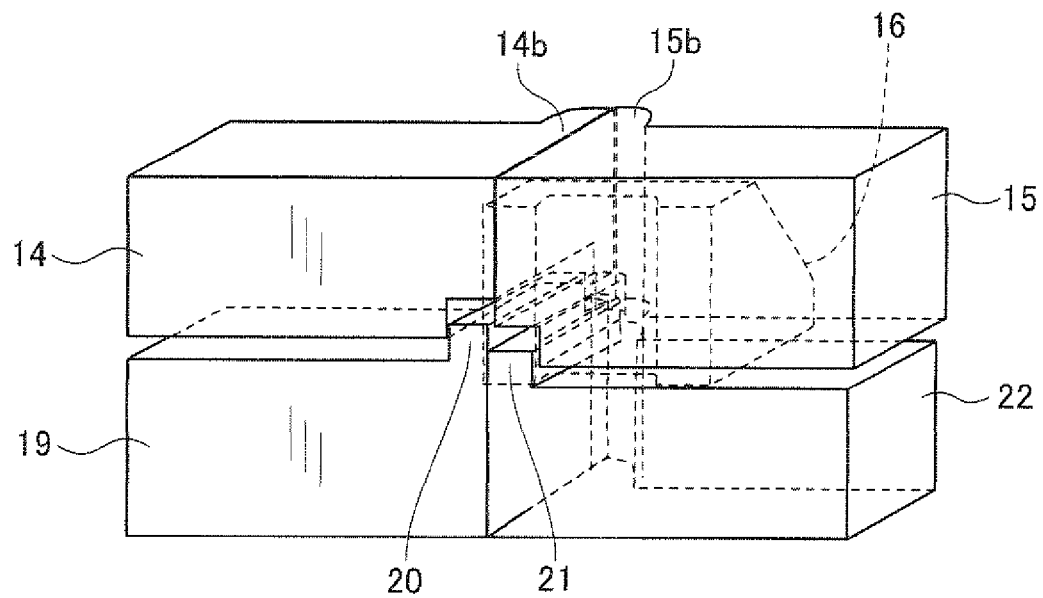
FIG. 7B is a perspective view showing the first and second pairs of the holding members when the formation of the crank-shaped portion has just finished.
Figure 8:
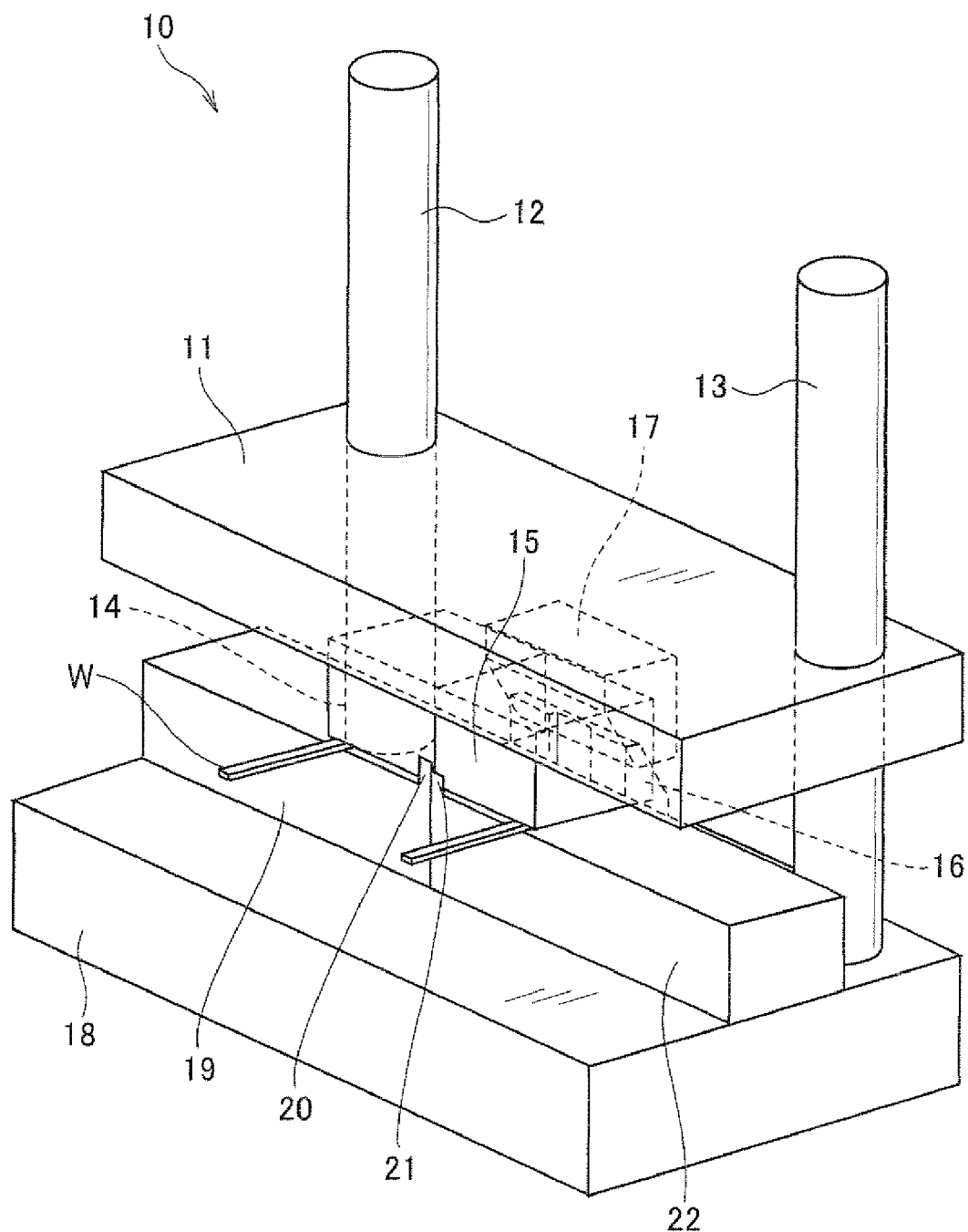
FIG. 8 is a perspective view showing the electric wire shaping apparatus when the formation of the crank-shaped portion in the section of the electric wire has just finished.
Figure 9A:
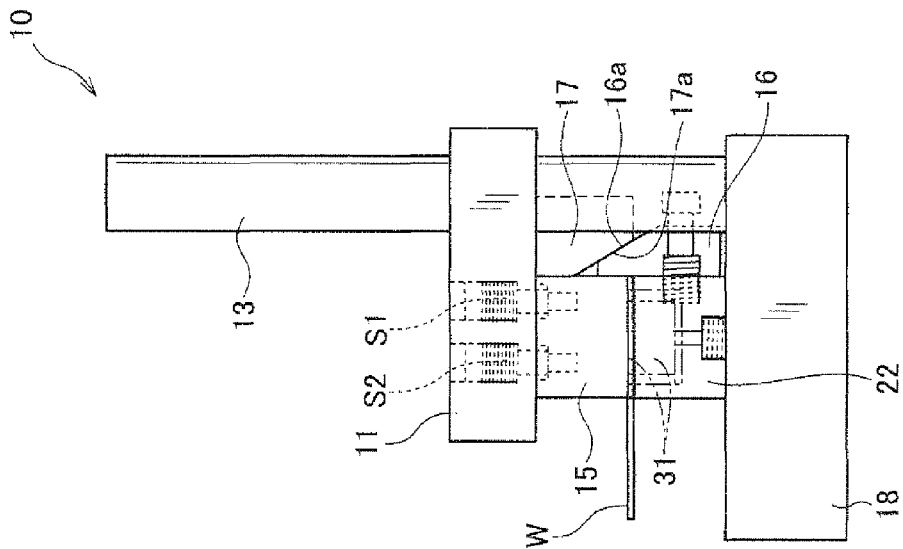
FIG. 9A is a front view showing the electric wire shaping apparatus when the formation of the crank-shaped portion has just finished.
Figure 9B:
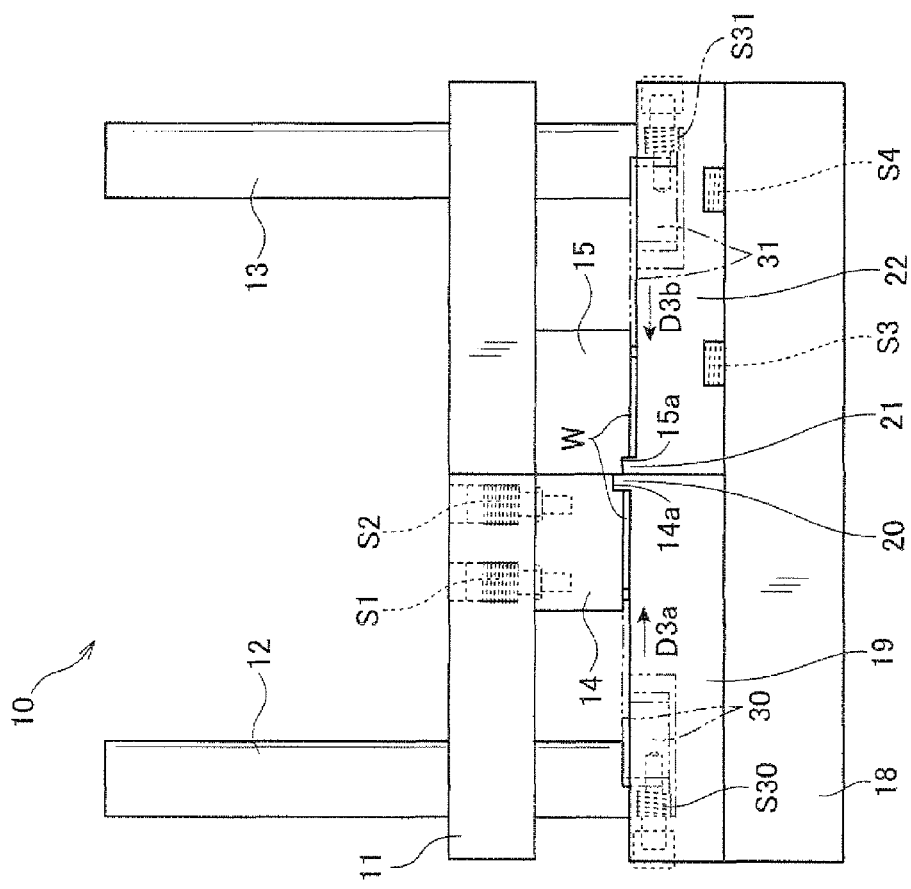
FIG. 9B is a side view showing the electric wire shaping apparatus when the formation of the crank-shaped portion has just finished.

FIGS. 7A-7B illustrate the first and second holders when the formation of the crank-shaped portion Wd has just finished. It should be noted that for the sake of simplicity, some elements of the electric wire shaping apparatus 10 are omitted from FIG. 7B. Moreover, FIGS. 8 and 9A-9B illustrate the electric wire shaping apparatus 10 when the formation of the crank-shaped portion Wd has just finished. As indicated with dashed lines in FIG. 7A, the crank-shaped portion Wd is formed in the apex part Wc of the turn portion Wa of the electric wire W.

After the formation of the crank-shaped portion Wd, the drive mechanism drives the moving plate 11 to move upward from its shaping finish position shown in FIGS. 8 and 9A-9B to return to its initial position shown in FIGS. 1 and 2A-2B. Consequently, the holding members 14, 15, 19, and 22 and the clamping member 16 are also returned to their initial positions shown in FIGS. 1 and 2A-2B, and the springs S1-S4 are restored to their initial un-compressed state. As a result, the section of the electric wire W is released from being clamped by the clamping mechanism and the first and second holders.

That is to say, the process of the electric wire shaping apparatus 10 for shaping the electric wire W also includes a releasing step in which the first and second holders release the apex part Wc of the turn portion Wa of the electric wire W.

Further, in the present embodiment, the first and second holders release the apex part Wc at different times. More specifically, after the holding members 14 and 15 are moved upward beyond their positions shown in FIGS. 6A-6B, the holding member 15 first recedes from the apex part Wc, followed later by the holding member 14. This is because the holding member 14, which is mounted to the moving plate 11 via the springs S1 and S2, remains in contact with the apex part Wc until the springs S1 and S2 are restored to their initial state (i.e., until the elastic forces of the springs S1 and S2 acting on the holding member 14 are removed), and then moves upward along with the moving plate 11. In comparison, the holding member 15, which is directly fixed to the moving plate 11, moves upward in synch with the moving plate 11.

Figure 10A:
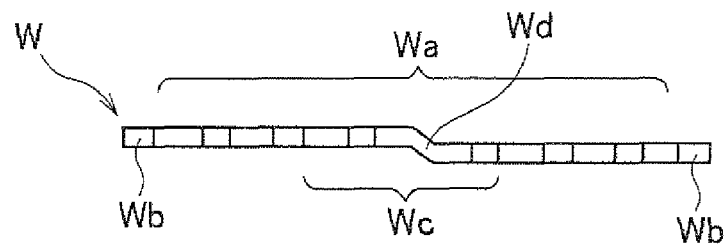
FIG. 10A is a side view of the section of the electric wire after being shaped by the electric wire shaping apparatus.
Figure 10B:
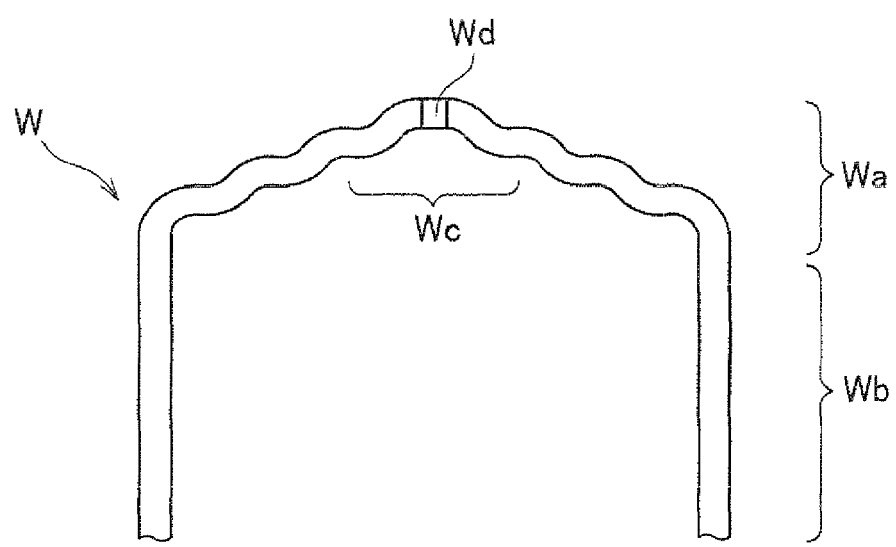
FIG. 10B is a plan view of the section of the electric wire after being shaped by the electric wire shaping apparatus.

FIGS. 10A-10B illustrate the section of the electric wire W after being shaped by the electric wire shaping apparatus 10.

It can be seen from FIGS. 10A-10B in comparison with FIGS. 4A-4B that after the shaping process, the crank-shaped portion Wd is formed in the apex part Wc of the turn portion Wa of the electric wire W. In addition, after the shaping process, the overall shape of the electric wire W is changed from two-dimensional to three-dimensional.

Figure 11:
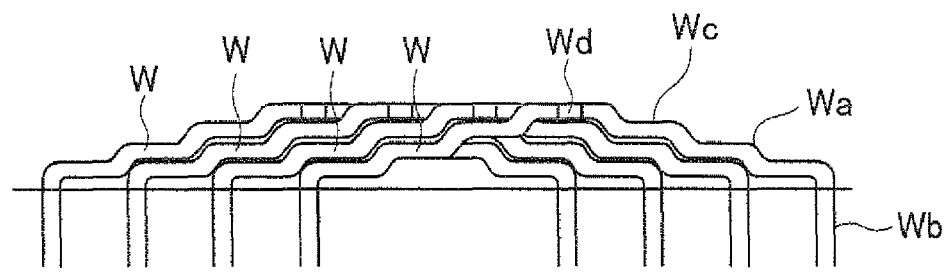
FIG. 11 is a plan view illustrating a manner of stacking a plurality of electric wires shaped by the electric wire shaping apparatus for forming a stator coil.

Next, a method of forming the stator coil 23 will be described. First, a plurality of (e.g., 6) electric wires W are prepared each of which has the crank-shaped portions Wd formed in the apex parts Wc of the turn portions Wa by the above-described shaping process. Then, the electric wires W are stacked, as shown in FIG. 11, to form a flat band-shaped electric wire assembly. Thereafter, the flat band-shaped electric wire assembly is rolled by a predetermined number of turns (e.g., six turns) to form a hollow cylindrical electric wire assembly which makes up the stator coil 23.

Figure 12:
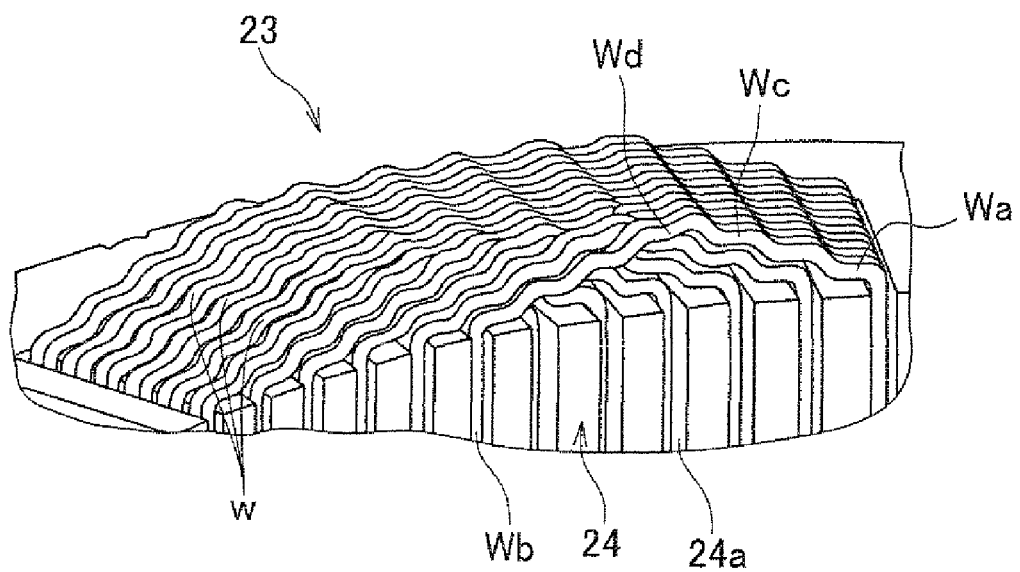
FIG. 12 is a perspective view illustrating the assembling of a stator core to the stator coil for forming a stator of an electric rotating machine.
Figure 13:
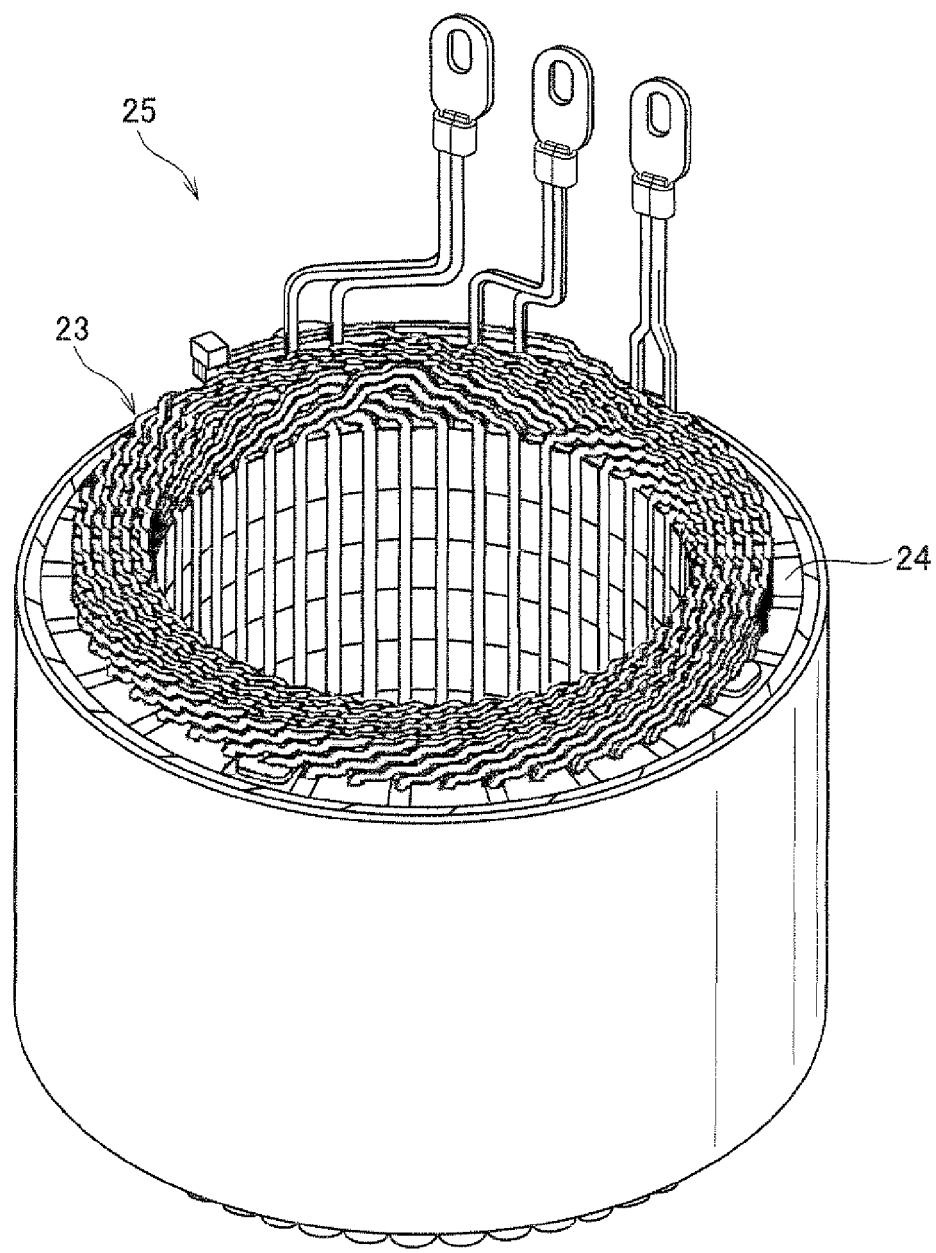
FIG. 13 is a perspective view of the stator.

Furthermore, the stator core 24 is assembled to the stator coil 23, as shown in FIG. 12, so that the straight portions Wb of the electric wires W are received in the slots 24a of the stator core 24 and the turn portions Wa of the electric wires W are located outside of the slots 24a to form the coil ends of the stator coil 23. As a result, a stator 25 of the electric rotating machine is obtained which is shown in FIG. 13.

According to the present embodiment, it is possible to achieve the following advantages.

In the present embodiment, the electric wire shaping apparatus 10 includes the clamping mechanism, the first and second holders, and the shaping mechanism. The clamping mechanism is configured with the clamping member 16 and the protrusions 20 and 21 to clamp the apex part Wc of one of the turn portions Wa of the electric wire W in the width-wise direction of the apex part Wc. The first holder is configured with the first pair of holding members 14 and 19 to hold (or clamp) the left half of the apex part Wc in the thickness-wise direction of the apex part Wc. The second holder is configured with the second pair of holding members 15 and 22 to hold (or clamp) the right half of the apex part Wc in the thickness-wise direction. The shaping mechanism includes the first holder (i.e., the first pair of holding members 14 and 19), the second holder (i.e., the second pair of holding members 15 and 22), the moving plate 11, and the driving mechanism. The shaping mechanism is configured to move one of the first and second holders relative to the other in the thickness-wise direction of the apex part Wc, thereby shaping the apex part Wc to form the crank-shaped portion Wd therein.

With the above configuration, the electric wire shaping apparatus 10 can shape the electric wire W to form the crank-shaped portion Wd in each of all the apex parts Wc of the turn portions Wa. Further, all the apex parts Wc of the turn portions Wa of the electric wire W are identical to each other regardless of the intervals between the straight portions Wb of the electric wire W (i.e., regardless of the coil pitches defined by the electric wire W). Therefore, it is possible to form the crank-shaped portion Wd in each of all the apex parts Wc with the same components, in other words, without replacing any components of the electric wire shaping apparatus 10. Consequently, it is possible to reduce both the manufacturing cost and manufacturing time of the stator coil 23 which has a plurality of coil pitches. In addition, with the clamping mechanism clamping the apex part Wc in the width-wise direction, it is possible to suppress the insulating coat covering the apex part Wc from bulging in the width-wise direction during the formation of the crank-shaped portion Wd in the apex part Wc.

In the present embodiment, each of the turn portions Wa of the electric wire W is stepped to include the apex part Wc at the center thereof. Moreover, for each of the turn portions Wa, the apex part Wc is shaped, as the specific part, to form the crank-shaped portion Wd therein.

Consequently, it becomes possible, without complicating the shape of the electric wire W, to secure the identical specific parts in the turn portions Wa of the electric wire W while allowing the intervals between the straight portions Wb of the electric wire W to be different.

In the present embodiment, the clamping mechanism includes the concave contact surface 16b of the clamping member 16, the convex contact surface 20a of the protrusion 20, and the convex contact surface 21a of the protrusion 21. The concave contact surface 16b is shaped so as to fit to the convex side surface of the apex part Wc of the turn portion Wa of the electric wire W. The convex contact surfaces 20a and 21a are shaped so as to together fit to the concave side surface of the apex part Wc.

Consequently, the contact surface area between the clamping mechanism and the apex part Wc of the turn portion Wa of the electric wire W can be maximized. As a result, the clamping mechanism can firmly clamp the apex part Wc in the width-wise direction, thereby ensuring the accuracy of formation of the crank-shaped portion Wd in the apex part Wc.

In the present embodiment, the shaping mechanism further includes the springs S1 and S2 that urge the holding member 14 of the first holder in the thickness-wise direction of the apex part Wc and the springs S3 and S4 that urge the holding member 22 of the second holder in the thickness-wise direction.

With the springs S1-S4, the first and second holders can hold the apex part Wc in the thickness-wise direction with constant pressing forces, thereby ensuring the accuracy of formation of the crank-shaped portion Wd in the apex part Wc.

In the present embodiment, the clamping mechanism includes the clamping member 16 and the protrusions 20 and 21. The clamping member 16 presses the apex part Wc from one side of the apex part Wc in the width-wise direction, while the protrusions 20 and 21 press the apex part Wc from the other side. The protrusions 20 and 21 are integrally formed respectively with the holding member 19 of the first holder and the holding member 22 of the second holder.

With the above integral formation, the parts count and thus the manufacturing cost of the electric wire shaping apparatus 10 are reduced.

In the present embodiment, the process of the electric wire shaping apparatus 10 for shaping the electric wire W includes the clamping step, the holding step, and the shaping step. In the clamping step, the clamping mechanism clamps the apex part Wc of one of the turn portions Wa of the electric wire W in the width-wise direction of the apex part Wc. In the holding step, the first and second holders respectively hold (or clamp) the left and right halves of the apex part Wc in the thickness-wise direction of the apex part Wc. In the shaping step, one of the first and second holders is moved relative to the other in the thickness-wise direction of the apex part Wc, thereby shaping the apex part Wc to form the crank-shaped portion Wd therein.

With the above process, it is possible to shape the electric wire W to form the crank-shaped portion Wd in each of all the apex parts Wc of the turn portions Wa. Further, all the apex parts Wc of the turn portions Wa of the electric wire W are identical to each other regardless of the intervals between the straight portions Wb of the electric wire W. Therefore, it is possible to form the crank-shaped portion Wd in each of all the apex parts Wc with the same components, in other words, without replacing any components of the electric wire shaping apparatus 10. Consequently, with the above process, it is possible to reduce both the manufacturing cost and manufacturing time of the stator coil 23 which has a plurality of coil pitches. In addition, by the clamping step, it is also possible to suppress the insulating coat covering the apex part Wc from bulging in the width-wise direction during the formation of the crank-shaped portion Wd in the apex part Wc.

In the present embodiment, the process of the electric wire shaping apparatus 10 for shaping the electric wire W further includes the releasing step in which the second holder first releases the apex part Wc and then the first holder releases the same.

In such a way of releasing the apex part Wc, it is possible to hold the apex part Wc for a while by the first holder after the second holder releases the apex part Wc. Consequently, it is possible to reliably keep the just-formed crank-shaped portion Wd in the apex part Wc.

Further, in the present embodiment, the first holder includes the holding members 14 and 19 that are respectively located on opposite sides of the apex part Wc in the thickness-wise direction of the apex part Wc. Moreover, the holding member 14 is pressed by the elastic forces of the springs S1 and S2 on the apex part Wc. In the releasing step, the apex part Wc is released from being held by the first holder by first removing the elastic forces of the springs S1 and S2 from the holding member 14 (i.e., first restoring the springs S1 and S2 to their initial un-compressed state) and then moving the holding member 14 away from the apex part Wc.

Consequently, the apex part Wc can be gradually released from being held by the first holder, thereby more reliably keeping the shape of the just-formed crank-shaped portion Wd.

While the above particular embodiment of the present invention has been shown and described, it will be understood by those skilled in the art that various modifications, changes, and improvements may be made without departing from the spirit of the invention.

[Modification 1]

In the previous embodiment, each of the turn portions Wa of the electric wire W is stepped to include the apex part Wc at the center thereof. However, each of the turn portions Wa may also have other shapes provided that all the apex parts Wc of the turn portions Wa are identical to each other regardless of the intervals between the straight portions Wb of the electric wire W. For example, each of the turn portions Wa may be curved instead of being stepped. Otherwise, it is also possible for each of the turn portions Wa to be partially stepped and partially curved.

[Modification 2]

In the previous embodiment, the apex parts Wc of the turn portions Wa of the electric wire W are shaped as the specific parts to form the crank-shaped portions Wd therein. However, it is also possible to shape, instead of the apex parts Wc, other parts of the turn portions Wa as the specific parts provided that those parts are identical to each other regardless of the intervals between the straight portions Wb of the electric wire W. For example, it is possible to shape, instead of the apex parts Wc, root parts of the turn portions Wa as the specific parts; each of the root parts adjoins one of the straight portions Wb.

[Modification 3]

In the previous embodiment, the electric wire W is an insulation-coated electric wire. However, the electric wire W may also be a bare electric wire which could be insulated after being shaped by the electric wire shaping apparatus 10.

[Modification 4]

The electric wire shaping apparatus 10 may further include a third holder that is configured with holding members 30 and 31 and springs S30 and S31, as shown in FIGS. 2A-2B and 9A-9B. More specifically, the holding member 30 may be mounted to the holding member 19 via the spring S30. The holding member 30 presses, with the elastic force of the spring S30, the left-side straight portion Wb rightward (i.e., in the direction D3a shown in FIGS. 2A and 9A). On the other hand, the holding member 31 may be mounted to the holding member 22 via the spring S31. The holding member 31 presses, with the elastic force of the spring S31, the right-side straight portion Wb leftward (i.e., in the direction D3b shown in FIGS. 2A and 9A). Consequently, with the third holder, it is possible to firmly hold, during the shaping of the apex part Wc, both the straight portions Wb so as to keep the interval between the straight portions Wb unchanged during the shaping. Consequently, it is possible to accurately define the coil pitches of the stator coil 23, thereby allowing all the straight portions Wb of the electric wire W to be smoothly placed into the corresponding slots 24a of the stator core 24.

[Modification 5]

In the previous embodiment, the springs S1 and S2 are interposed between the moving plate 11 and the holding member 14 and the springs S3 and S4 are interposed between the base 18 and the holding member 22. However, it is also possible to interpose the springs S1 and S2 between the base 18 and the holding member 19 and the springs S3 and S4 between the moving plate 11 and the holding member 15. In addition, the number of springs used for each of the first and second holders may be different from two, for example one or three.

[Modification 6]

In the previous embodiment, the helical springs S1-S4 are employed as the elastic members for the first and second holders. However, it is also possible to employ, instead of the helical springs S1-S4, other elastic members such as rubber members and fluid springs.

[Modification 7]

In the previous embodiment, the power transmission direction is changed from the vertical direction D1 to the horizontal direction D2 by means of the sliding contact between the inclined surface 17a of the protruding member 17 and the inclined surface 16a of the clamping member 16. However, it is also possible to change the power transmission direction by other means, for example a rack and pinion mechanism.

What is claimed is:

1. A method of shaping an electric wire for a stator coil of an electric rotating machine, comprising:

providing an electric wire that has a substantially rectangular cross-section and is pre-formed to include a plurality of straight portions and a plurality of turn portions, the straight portions extending straight, in parallel with each other and spaced apart at predetermined intervals, each of the turn portions connecting one adjacent pair of the straight portions, each of the turn portions including a specific part, and all of the specific parts of the turn portions being identical to each other regardless of the intervals between the straight portions;

the method further comprising:

a clamping step in which the specific part of one of the turn portions of said pre-formed electric wire is clamped in a widthwise-direction of the specific part;

a holding step in which two different sections of said clamped specific part are respectively held by first and second holders in a thickness-wise direction of the specific part, which is perpendicular to the widthwise-direction; and a shaping step in which one of the first and second holders is moved relative to the other in said thickness-wise direction of the specific part, thereby correspondingly moving one of said two different sections relative to the other of said two different sections in said thickness-direction, to form a crank-shaped portion in said specific part.

2. The method as set forth in claim 1, further comprising a releasing step in which the second holder first releases the specific part and then the first holder releases the specific part.

3. The method as set forth in claim 2, wherein said holding step comprises providing a first holder that includes first and second holding members that are respectively located on opposite sides of the specific part in the thickness-direction of the specific part, and pressing the first holding member by an elastic force on the specific part, and said releasing step comprises releasing the specific part from the first holder by first removing the elastic force from the first holding member and then moving the first holding member away from the specific part.

* * * * *